United States Patent [19]

Cooke et al.

[11] Patent Number: 5,160,535

[45] Date of Patent: Nov. 3, 1992

[54] RAPIDLY DRYING IMPULSE INK JET INK COMPOSITIONS

[75] Inventors: Theodore M. Cooke, Danbury, Conn.; Wilfred F. Reed, Ashland, Mass.

[73] Assignee: Trident, Inc., Brookfield, Conn.

[21] Appl. No.: 640,277

[22] Filed: Jan. 11, 1991

[51] Int. Cl.⁵ .............................................. C09D 11/02
[52] U.S. Cl. ................................................. 106/19 R
[58] Field of Search ........................ 106/22, 27, 31, 20

[56] References Cited

U.S. PATENT DOCUMENTS

| | | | |
|---|---|---|---|
| 3,870,528 | 3/1975 | Edds et al. | 106/31 |
| 3,912,520 | 10/1975 | Miyajima et al. | 106/32 |
| 4,308,061 | 12/1981 | Iwahashi et al. | 106/22 |
| 4,383,859 | 5/1983 | Moore et al. | 106/22 |
| 4,610,554 | 9/1986 | Suzuki et al. | 106/20 |
| 4,822,418 | 4/1989 | Lin et al. | 106/27 |
| 4,975,117 | 12/1990 | Tabayashi et al. | 106/22 |

OTHER PUBLICATIONS

"CRC Handbook of Chemistry & Physics", 63rd ed., Weast et al., 1983, pp. F-41-F-46.

Primary Examiner—William R. Dixon, Jr.
Assistant Examiner—Helene Klemanski
Attorney, Agent, or Firm—Woodcock Washburn Kurtz Mackiewicz & Norris

[57] ABSTRACT

Impulse-type ink jet ink compositions and processes for recording information therewith are provided. The ink compositions dry to the touch more rapidly than the impulse-type inks known in the art. The rapid-drying characteristics are believed to be attributable to their relatively low viscosities. The ink compositions preferably comprise from about 80 to about 99 percent by weight of a liquid vehicle which consists essentially of an organic solvent having a viscosity less than about 7.0 centipoise at 20° C. and from about 1 to about 15 percent by weight of a colorant. The ink compositions are suitable for printing alphanumeric text or bar codes on highly calendared paper or other non-absorbent surfaces.

27 Claims, 1 Drawing Sheet

RAPIDLY DRYING IMPULSE INK JET INK COMPOSITIONS

FIELD OF THE INVENTION

The present invention relates to ink compositions for use in drop-on-demand or impulse-type ink jet printers and, more specifically, to low-viscosity ink jet compositions which dry rapidly upon contacting highly calendared paper.

BACKGROUND OF THE INVENTION

Ink jet printing is performed by discharging ink droplets from a print head to a substrate. The droplets are ejected through orifices or nozzles in the print head and are directed to the substrate to form an image thereon. In contrast to many other types of printing, there is no contact between the printer and the substrate in ink jet techniques.

Most of the ink jet printers known in the art may be characterized as either continuous or impulse devices, depending upon the mechanism by which the ink droplets are directed to the substrate. In continuous ink jet systems, an essentially uninterrupted stream of ink is ejected from a nozzle and breaks up into droplets. The droplets bear an electric charge so that they can be deflected by an applied electric field which is modulated according to the particular image to be recorded. The electric field directs the droplets toward either the substrate or an ink re-circulating reservoir. The inks employed in conjunction with continuous ink jet systems typically comprise a colorant such as a dye or pigment, an electrolyte to facilitate droplet deflection, and a liquid vehicle to dissolve or disperse the colorant and the electrolyte. Typically, the vehicle comprises water, an organic solvent, or a mixture thereof. The water is sometimes used to control the viscosity of the ink.

With so-called "impulse" or "drop-on-demand" ink jet printers, image formation is controlled by selectively energizing and de-energizing a piezoelectric transducer rather than by modulating an applied electric field. Ink is stored in the print head or nozzle until it is necessary to form an image on the substrate. The printer is then activated to apply pressure to the ink and discharge a selected number of discrete ink droplets toward the substrate. These ink droplets need not bear an electric charge. Accordingly, impulse ink compositions are free of corrosive substances such as water and electrolytes which continuous stream inks often comprise.

However, impulse ink jet printers present a number of problems which are not encountered in continuous ink jet systems. For example, unlike continuous ink jet printers, impulse printers typically are maintained in a stand-by or temporarily inoperative mode between printing cycles. Thus, the ink is allowed to stand and possibly solidify in the discharge orifices of the print head. Impulse printers normally begin a printing cycle with such material in place. Many of the start-up problems encountered with impulse printers are attributable to ink which has been allowed to stand in the discharge orifices during stand-by periods. Such material is less of a concern in continuous systems because there typically are fewer interruptions in the flow of ink. Even where ink is allowed to stand and solidify, it is more easily purged due to the considerably higher pressures at which continuous ink jet printers operate. Accordingly, impulse-type inks must be specially formulated to minimize start-up problems.

Numerous ink compositions for impulse ink jet printers are known in the art. However, most of these inks are not suitable when the ink is to be used for writing on surfaces such as highly calendared paper which absorb the ink only slowly. As will be appreciated by those of skill in the art, printed images typically cannot become dry to the touch before either the ink solvents have evaporated or the ink has been absorbed by the writing surface. The rapid evaporation of solvents from the ink, however, often leads to clogging of discharge orifices during stand-by periods. Thus, the rate at which writing surfaces absorb impulse ink jet inks provides a critical limitation to the drying of printed matter. Rapid drying is often necessary where objects such as conveyor belts come in contact with freshly printed articles or where the articles are to be stacked shortly after printing.

Therefore, there exists a need for a rapidly drying ink composition for use in impulse-type ink jet printers.

SUMMARY OF THE INVENTION

The present invention provides impulse-type ink jet ink compositions which dry to the touch more rapidly than the impulse-type inks known in the art. The rapid-drying characteristics of the ink compositions are believed to be attributable to their relatively low viscosities and their ability to wet a highly calendared surface.

The ink compositions preferably comprise from about 80 to about 99 percent by weight of a liquid vehicle which consists essentially of an organic solvent having a viscosity less than about 7.0 centipoise at 20° C. and from about 1 to about 20 percent by weight of a colorant. In preferred embodiments, ink compositions comprise about 95 percent by weight or an organic solvent which comprises diethylene-glycol monoethyl ether and about 5 percent by weight of a colorant which comprises a Nigrosine dye.

The present invention also provides processes for recording information on a substrate using the disclosed novel ink compositions. In preferred embodiments, the processes comprise the steps of providing the ink composition; ejecting one or more droplets of the ink composition from an orifice by the selective application of pressure; and contacting the droplets with a receiving surface on the substrate.

BRIEF DESCRIPTION OF THE DRAWINGS

The numerous objects and advantages of the present invention may be better understood by those skilled in the art by reference to the accompanying FIGURE, in which.

DETAILED DESCRIPTION OF THE INVENTION

Figure 1:
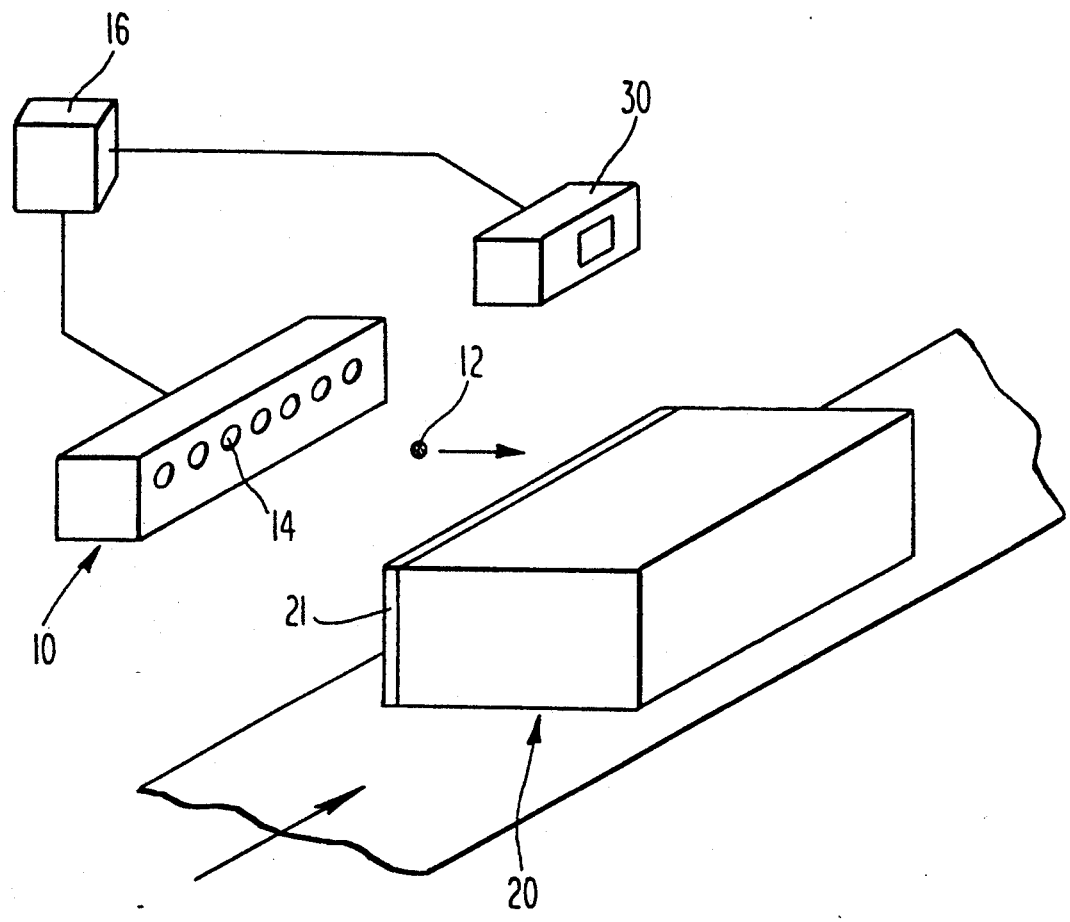
FIGURE 1 depicts an impulse ink jet printing apparatus according to the present invention.

The rapid-drying ink compositions of this invention have relatively low viscosities in order to facilitate the penetration of the ink into the substrates to which they are applied. For porous substrates such as paper, it is known that the penetration of a liquid is given by Equation (1):

$$\frac{dl}{dt} = \frac{r \cdot o \cdot \cos\theta}{N \cdot 4l} \quad (1)$$

where dl/dt is the rate of penetration of the liquid, r is the radius of the pores, o is the surface tension of the liquid, $\theta$ is the angle of contact between the liquid and the substrate, N is the viscosity of the liquid, and 1 is the depth of liquid penetration.

For most applications, the surface tension of impulse-type inks should be such that droplets of the ink contact the substrate with a contact angle of between about 1 and about 45 degrees, preferably about 1 degree. It will be recognized that droplets having lower contact angles with the substrate will tend to occupy more well-defined positions on the substrate and, in turn, result in clearer images.

Thus, for most applications, viscosity is the major ink-related variable in Equation 1 which may be adjusted without sacrificing print quality. It has been found in accordance with the present invention that where all other factors in Equation 1 are kept constant or nearly constant, an impulse ink jet ink having a low viscosity will penetrate and, hence, dry more rapidly than an ink having a high viscosity. Accordingly, the present ink jet ink compositions are formulated to have low viscosity, preferably less than about 8.0 centipoise at 25° C.

Ink compositions according to the present invention preferably comprise from about 80 to about 99 percent by weight of a low-viscosity liquid vehicle. The liquid vehicle is selected to effectively dissolve the colorant present in the ink composition, to possess a relatively low rate of evaporation, preferably lower than that of butyl acetate, and to produce ink droplets which form low contact angles with the substrate. As will be appreciated by those of skill in the art, slowly evaporating liquid vehicles will generally present fewer problems in re-starting a printer which has been allowed to stand idle for a period of time.

The liquid vehicle consists essentially of an organic solvent having a viscosity less than about 7.0 centipoise at 20° C. The organic solvent may comprise one or more of the many chemically distinct, low-viscosity organic solvents known in the art, such as, for example, ethylene-glycol monomethyl ether, ethylene-glycol monoethyl ether, diethylene-glycol monomethyl ether, diethylene-glycol monobutyl ether, 1-butoxyethoxy-2-propanol, diethylene-glycol monoethy ether, ethylene-glycol monobutyl ether, ethylene-glycol monohexyl ether, and ethoxytriglycol. Diethylene-glycol monoethyl ether, ethylene-glycol monobutyl ether, ethylene-glycol monohexyl ether, and ethoxytriglycol are preferred. Due to health and toxicity problems associated with many low-viscosity solvents, diethylene-glycol monoethyl ether—which is commercially available from Union Carbide Corporation of New York, N.Y. under the tradename Carbitol (low gravity)—is particularly preferred.

Preferred ink compositions comprise from about 1 to about 20 percent by weight of a colorant. The choice of colorant and its concentration principally depend on the solubility of the colorant and the intensity of its color for a particular application. Preferably, the colorant is selected to render the ink composition visible to the human eye or some mechanical data collection device such as a bar code scanner or other type of optical character reader operating in the wavelength range of from about 400 to about 960 nanometers. A preferred colorant comprises Nigrosine dye. Nigrosine dye is particularly suitable for use in the present ink compositions to produce infrared-readable images, since Nigrosine dyes have been found to have a wide spectrum absorption range of from at least 500 nm to 900 nm. Other useful colorants include one or more dyes which are soluble in the liquid vehicle, such as the Orasol black and Orasol red dyes, which are available from Ciba-Geigy Co. of Ardsley, N.Y.

The ink compositions of this invention may further comprise one or more of the ink additives known in the art, so long as incorporation of the additive does not increase the drying times of the inks upon application to a substrate.

The present invention also provides processes for recording information on a substrate with the above-described ink compositions. The recorded information may be in the form of alphanumeric text, bar codes, or other types of images or symbols, so long as the information is visually or mechanically readable.

A preferred process according to the present invention is depicted in FIG. 1, wherein one or more droplets (12) of the ink composition are ejected from a orifices (14) by selectively energizing and de-energizing piezoelectric transducers (not shown) in a print head (10). The operation of the transducers and, hence, the ejection of the droplet is controlled by a processing means (16) such as a computer.

After ejection from the print head (10), the droplet (12) is directed to a receiving surface (21) on the substrate (20) to form a printed image. It is preferred that the printed image be dry to the touch as rapidly as possible, preferably within about 5 seconds of application.

Numerous printing substrates such as papers, glasses, metals, and plastics are known in the art to comprise receiving surfaces with which ink droplets may be contacted. It will be recognized that substrates can vary greatly in terms of physicochemical properties such as smoothness, porosity and surface treatment, and that such physicochemical properties will greatly influence the printing process and the choice of an ink composition. For example, where paper has been rendered smooth and non-absorbent due to calendaring or a chemical treatment, a greater premium is placed on the penetrating abilities of the ink than where a porous, untreated substrate is employed. The ink compositions of the present invention have been found to rapidly dry after application to magazine stock and other relatively nonabsorbent surfaces such as paper having a smoothness between about 40 and about 60 Sheffield units.

It is preferred that the processes of the present invention be performed at temperatures between about 20° and about 70° C., more preferably between about 30° and about 40° C. At these temperatures, suitable application viscosities of the ink compositions may be obtained. However, as will be appreciated by those skilled in the art, ink drying times can generally be decreased by increasing the temperature of the ink and/or the temperature of the substrate. In preferred embodiments, the substrate will be heated by, for example, warm air either before or after application of ink thereto.

As shown in FIG. 1, the substrate (20) preferably has a component of movement transverse to the path of the droplet (12). Such relative movement may be produced by moving the substrate (20) past a stationary print head (10), as shown in FIG. 1, or by moving the print head past a stationary substrate. The accuracy and/or clarity of the recorded information optionally may be determined by reading the information with a mechanical data collection device (30) positioned upstream from the print head Additional objects, advantages, and novel features of this invention will become apparent to those skilled in the art upon examination of the following examples thereof, which are not intended to be limiting, wherein parts and percents are by weight unless otherwise indicated.

The formulations listed in Table 1 were applied to paper having a wire side smoothness of about 58 Sheffield units and a felt side smoothness of about 42 Sheffield units. An ULTRAJET Model 96/32 liquid ink jet imaging print head, which is commercially available from Trident, Inc. of Brookfield, Conn., was employed to apply the inks. Drying times were determined by draw-down techniques. As can be seen from Table 1, the tested formulations possessed both low viscosities and excellent drying times.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

TABLE 1

|  | 1 | 2 | 3 | 4 | 5 | 6 |
|---|---|---|---|---|---|---|
| Diethylene-glycol monoethyl ether | 95 | — | — | — | — | — |
| Ethylene-glycol monobutyl ether | — | 97 | 97 | — | — | — |
| Ethylene-glycol monohexyl ether | — | — | — | 97 | 97 | — |
| Ethoxy triglycol | — | — | — | — | — | 96 |
| Nigrosine dye | 5 | — | — | — | — | — |
| Orasol black | — | 3 | — | 3 | — | 4 |
| Orasol red | — | — | 3 | — | 3 | — |
| Viscosity at 25° C. (cps) | 5.6 | 3.6 | 3.7 | 5.2 | 5.2 | 8.0 |
| Dry to touch (sec) | <4 | <1 | <3 | <4 | <4 | <9 |

What is claimed is:

1. An ink composition for use in impulse ink jet printers, comprising:
   from about 80 to about 99 percent by weight of a liquid vehicle which consists essentially of an organic solvent having a viscosity less than about 7.0 centipoise at 20° C.; and
   from about 1 to about 20 percent by weight of a colorant;
   wherein said ink composition is substantially free of electrolytic moieties.

2. The ink composition of claim 1 wherein the organic solvent comprises one or more low-viscosity solvents selected from the group consisting of ethyleneglycol monomethyl ether, ethylene-glycol monoethyl ether, diethylene-glycol monomethyl ether, diethylene-glycol monobutyl ether, 1-butoxyethoxy-2-propanol, diethylene-glycol monoethyl ether, ethylene-glycol monobutyl ether, ethylene-glycol monohexyl ether, and ethoxytriglycol.

3. The ink composition of claim 1 wherein the organic solvent comprises one or more low-viscosity solvents selected from the group consisting of diethyleneglycol monoethyl ether, ethyleneglycol monobutyl ether, ethylene-glycol monohexyl ether, and ethoxytriglycol.

4. The ink composition of claim 1 wherein the organic solvent comprises diethylene-glycol monoethyl ether.

5. The ink composition of claim 1 wherein the organic solvent constitutes between about 95 and about 99 percent by weight of the ink composition.

6. The ink composition of claim 1 wherein the organic solvent evaporates less rapidly than butyl acetate.

7. The ink composition of claim 1 wherein the colorant is visible to the human eye.

8. The ink composition of claim 1 wherein the colorant comprises a Nigrosine dye.

9. The ink composition of claim 1 wherein the colorant absorbs light having a wavelength between about 400 and about 960 nanometers.

10. The ink composition of claim 1 wherein the colorant constitutes from about 1 to about 5 percent by weight of the ink composition.

11. The ink composition of claim 1 wherein the colorant constitutes about 5 percent by weight of the ink composition.

12. The ink composition of claim 1 which has a viscosity less than about 8.0 centipoise at 25° C.

13. An ink composition for use in impulse ink jet printers, comprising:
    about 95 percent by weight of diethylene-glycol monoethyl ether; and
    about 5 percent by weight of a Nigrosine dye.

14. A process for recording information on a substrate, comprising the steps of:
    providing an ink composition which is substantially free of electrolytic moieties and which comprises:
       from about 80 to about 99 percent by weight of a liquid vehicle which consists essentially of an organic solvent having a viscosity less than about 7.0 centipoise at 20° C.; and
       from about 1 to about 20 percent by weight of a colorant;
    ejecting one or more droplets of the ink composition from an orifice by the selective application of pressure; and
    contacting the droplets with a receiving surface on the substrate.

15. The process of claim 14 wherein the organic solvent is selected from the group consisting of diethyleneglycol monoethyl ether, ethylene-glycol monobutyl ether, ethylene-glycol monohexyl ether, and ethoxy triglycol.

16. The process of claim 14 wherein the organic solvent comprises diethylene-glycol monoethyl ether.

17. The process of claim 14 wherein the droplet dries to touch upon the receiving surface in about 5 seconds or less.

18. The process of claim 14 wherein droplet penetrates the receiving surface in about 5 seconds or less.

19. The process of claim 14 wherein the receiving surface has a smoothness of between about 40 and about 60 Sheffield units.

20. The process of claim 14 wherein the receiving surface is paper.

21. The process of claim 14 wherein a contact angle of from about 1 to about 45 degrees is formed between the droplets and the receiving surface.

22. The process of claim 14 wherein the information comprises alphanumeric text.

23. The process of claim 14 wherein the information comprises bar codes.

24. The process of claim 14 wherein the information absorbs light having a wavelength between about 400 and about 960 nanometers.

25. The process of claim 14 further comprising reading the information with a mechanical data collection device.

26. The process of claim 14 further comprising heating the substrate.

27. The process of claim 25 wherein the mechanical data collection device is an optical character reading operating in the wavelength range of from about 400 to about 960 nanometers.

* * * * *